J. P. LAVIGNE.
VALVE.
APPLICATION FILED JAN. 22, 1917.
1,294,491. Patented Feb. 18, 1919.
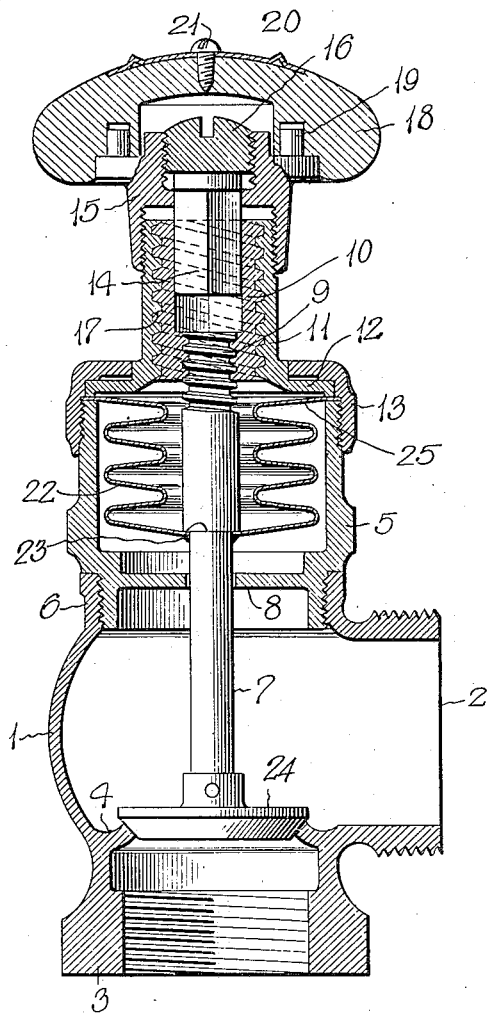
Witnesses
Chas. W. Stauffiger
Anna M. Dorr
Inventor
Joseph P. Lavigne,
By Barthel & Barthel
Attorneys

UNITED STATES PATENT OFFICE.

JOSEPH P. LAVIGNE, OF DETROIT, MICHIGAN.

VALVE.

1,294,491.

Specification of Letters Patent.  Patented Feb. 18, 1919.

Application filed January 22, 1917. Serial No. 143,766.

*To all whom it may concern:*

Be it known that I, JOSEPH P. LAVIGNE, a citizen of the United States of America, residing at Detroit, in the county of Wayne and State of Michigan, have invented certain new and useful Improvements in Valves, of which the following is a specification, reference being had therein to the accompanying drawings.

In the manufacture of valves for steam lines, hot water systems and the like, it is desirable to avoid as much as possible the use of gaskets or other material which deteriorate readily under the influence of the fluid passing through the valve. It is also preferable to arrange the valve to stand rough usage, as in the ordinary disposition of such valves in heating system, they frequently become steps on which the operator stands while adjusting some more remote part.

This invention relates to a valve in which the usual gaskets are entirely replaced by a packing member that is practically indestructible, the valve likewise being so arranged that the operator may step on it or subject it to other rough usage without injury.

The invention consists in the matters hereinafter set forth, and more particularly pointed out in the claims.

The drawing is a view in longitudinal section, with parts in elevation, of a valve that embodies features of the invention.

As herein shown, a casing 1 has a lateral nipple 2 and an outlet nipple 3 each arranged in connection with a steam line in any preferred manner. An annular valve seat 4 is in axial alinement with a packing chamber 5 that is detachably mounted as by screwthreading into a suitable annular flange 6 of the casing. A valve closure 24 that is arranged to seal the seat 4, is mounted on a stem 7 that extends upwardly through the packing chamber 5, a bridge or cross wall 8 loosely encircling the stem.

An upper screwthreaded portion 9 of the stem 7, engages into a sleeve 10 that is screwthreaded into a bushing 11. The threads of the stem and bushing are opposite in pitch, the sleeve having a very coarse right hand thread which is herein shown as double, while the stem 9 has a left hand screw. The bushing has a base flange 12 that is clamped on to the upper part of the packing chamber 5, by a suitable holding ring 13, exteriorly arranged for application of a wrench.

The squared, splined, flattened or polygonal depending stem 14 of a handle ferrule or plate 15, non-rotatably secured therein as by a holding nut 16 inserted in the interiorly screwthreaded and counterbored end portion of the plate, is longitudinally reciprocable and non-rotatable in the sleeve 10. The plate 15 is rotatable on the bushing 11 with which it has a fine screwthreaded engagement whereby the parts are held in place, without impeding the necessary movement of the handle. The pitch of the threads 17 between the members 10 and 11, and that of the screwthreaded portion 9 of the stem 7, are such that a part rotation of the handle plate 15 projects the stem and spindle for the entire distance of the throw of the closure 24 to and from the seat 4. Preferably the handle is provided with a heat-insulated grip 18 that is held in position by thumb screws and by dowels 19 or other suitable means and is likewise guarded by a shield plate 20 secured by a screw 21 in heat insulated relation to the rest of the valve. As herein shown and as a desirable form of construction the handle member 18 is convex, but at any rate the guard plate 20 is so arranged as to lie above the plane of the upper portion thereof and form a tread piece for any one stepping on the valve so that the grip is not injured thereby.

To avoid leakage through and around the closure-operating members, a collapsible drum, the side wall 22 of which is deeply and transversely corrugated, is connected at its inner end portion as by brazing, soldering or the like, to a shoulder 23 formed on the stem 7 or is made fast in other suitable manner to provide a tight joint. A base flange 25 formed on the otherwise open end portion of the drum is clamped between the base flange of the bushing 11 and the member 5 by the securing ring 13. The drum also prevents the rotation of the stem when the handle is turned, although this may be otherwise accomplished as by keying the stem to non-rotatably engage the cross-wall.

In operation, a part turn of the handle on its fine screw threads rotates and advances or retracts, according to the direction of rotation, the coarsely threaded sleeve 10 in the bushing 11. This not only bodily projects or retracts the stem 7 because of the sleeve's axial movement but also projects or retracts the stem because of the screw threaded engagement of this non-rotatable stem with the sleeve so that a slight movement of the handle gives a very large movement to the closure, the direction of pitch of the threads 17 being right hand while the stem thread is left hand.

As a result of this construction, a valve is obtained that is easily assembled as the parts are practically in alinement and are quickly mounted on each other. Furthermore the double projecting threads of the stem permit a part turn of the handle to give the required play to the closure. Another very great advantage is the use of the collapsible drum, which hermetically seals the joints around the stem and thereby obtains the same effect as a packing gland without the friction necessary to operate the latter, and without deterioration from the destruction of the soft packing that is necessary in such construction.

Obviously, changes in the details of construction may be made without departing from the spirit of the invention and I do not care to limit myself to any particular form or arrangement of parts.

What I claim is:—

1. In a valve, a casing provided with an inner annular valve seat, a closure for the seat provided with a stem, a packing chamber detachably mounted on the casing through which the closure stem extends, a corrugated longitudinally collapsible drum secured at one end hermetically to and around the stem in the packing chamber with the flared other end portion resting on the packing chamber wall, a bushing provided with a base flange resting on the drum flange, a holding ring securing the bushing on to the packing chamber and drum flange, a sleeve screw-threaded into the bushing in screw-threaded engagement with the stem and manually operable means for rotating the sleeve.

2. In a valve, a casing, a closure controlling flow therethrough provided with a longitudinally reciprocable stem, a packing chamber detachably mounted on the casing through which the stem extends, a longitudinally collapsible drum hermetically secured at the lower end to the stem, a flared flange on the upper edge of the drum resting on the end face of the packing chamber, a bushing having a base flange resting on the drum flange, a holding ring screw-threaded onto the packing chamber and arranged to clamp the base flange of the bushing onto the drum flange, a sleeve interiorly screw-threaded to engage the stem and exteriorly screw-threaded to engage in the bushing, a handle plate in non-rotatable, telescopic engagement with the sleeve.

In testimony whereof I affix my signature in the presence of two witnesses.

JOSEPH P. LAVIGNE.

Witnesses:
ANNA M. DORR,
CHAS. W. STAUFFIGER.